Nov. 20, 1928.  
O. G. SCHMITT  
1,692,387  
MACHINE FOR MAKING FLEXIBLE PADS  
Original Filed March 9, 1927  2 Sheets-Sheet 1
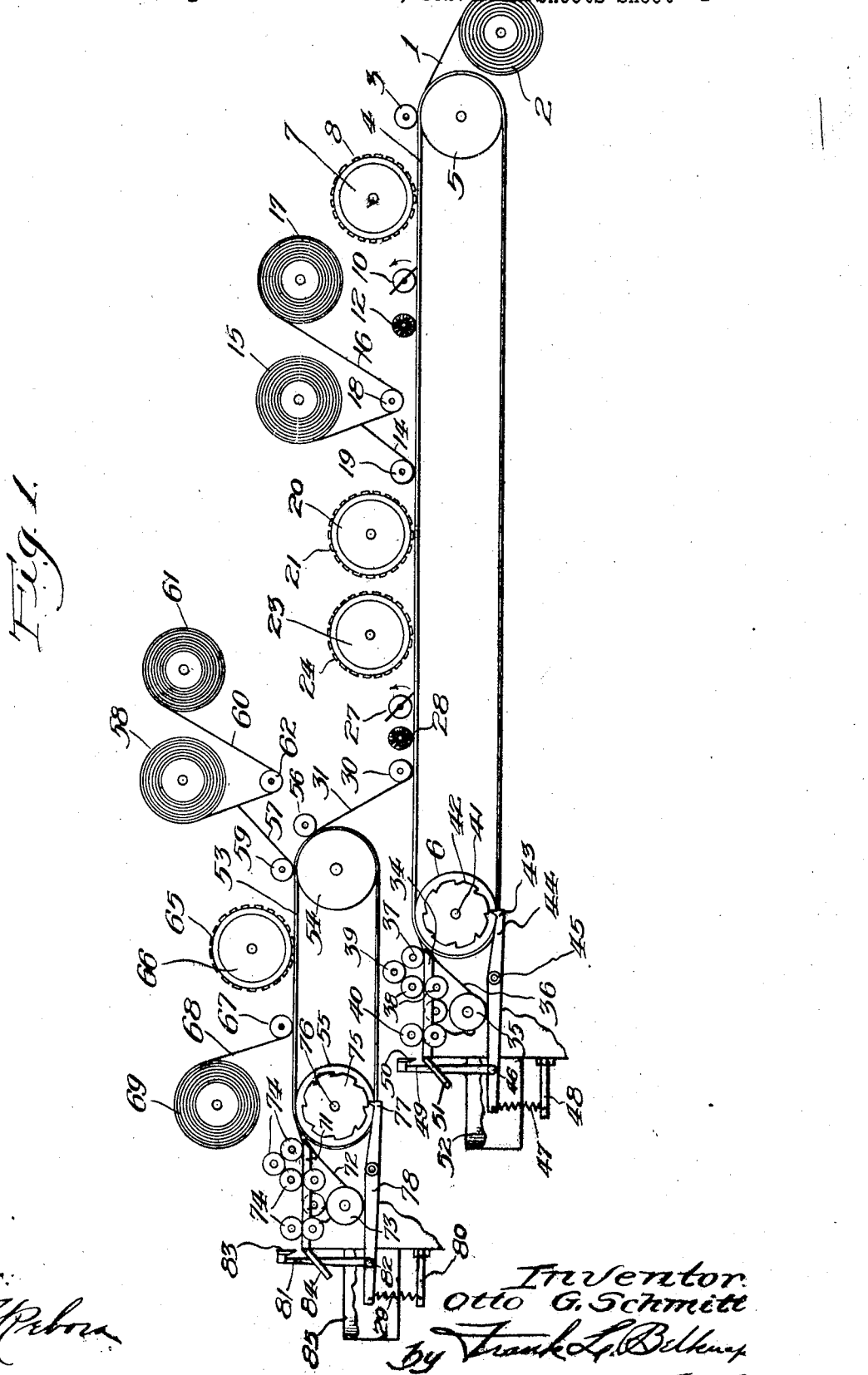

Nov. 20, 1928.  
O. G. SCHMITT  
1,692,387  
MACHINE FOR MAKING FLEXIBLE PADS  
Original Filed March 9, 1927   2 Sheets-Sheet 2
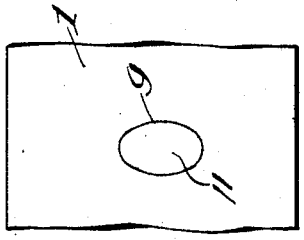
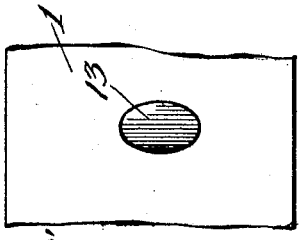
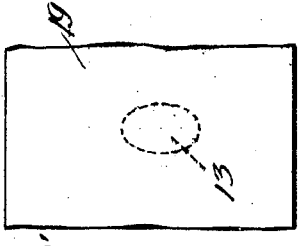
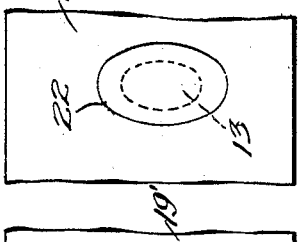
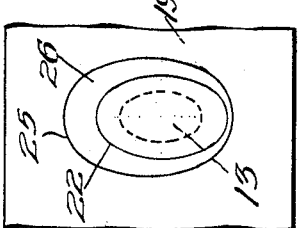
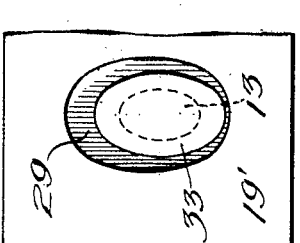
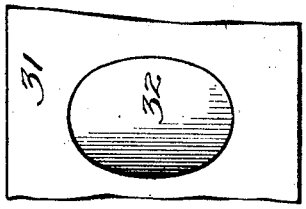
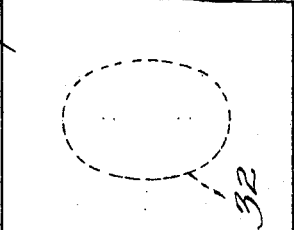
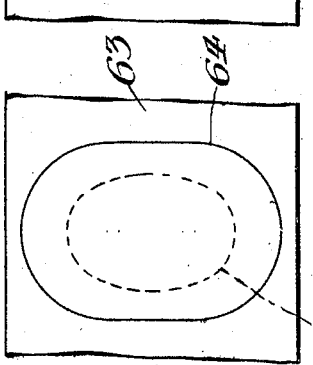
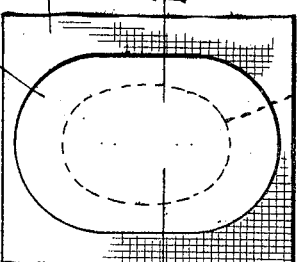
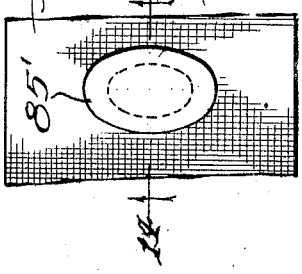
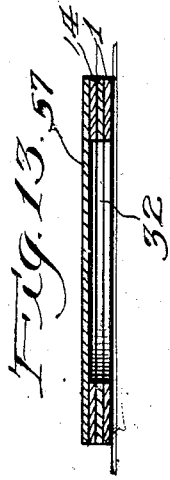
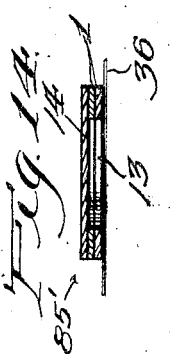
Inventor:  
Otto G. Schmitt,  
by Frank L. Belknap  
Atty Patented Nov. 20, 1928.

1,692,387

UNITED STATES PATENT OFFICE.

OTTO G. SCHMITT, OF CHICAGO, ILLINOIS.

MACHINE FOR MAKING FLEXIBLE PADS.

Application filed March 9, 1927, Serial No. 173,882. Renewed May 31, 1928.

The present improvements relate to a method and more specifically to a machine adapted to successively act upon a forwardly moving continuous sheet of flexible material to produce pads or plasters to be applied to corns, bunions, callouses and similar ailments of the feet. These pads generally comprise medicated and non-medicated pads.

The essence of the present invention resides in a machine which is entirely automatic in operation, producing pads or plasters above described, as part of a continuous operation, resulting in increased output and a saving of time and labor.

The invention of the present application comprises, in part, an improvement on my co-pending application Serial No. 147,604 filed November 10th, 1926. The basic mechanical combinations and principles underlying the machine described in said application are common to the present invention.

It is well known that corn, callous and bunion pads differ respectively in size and shape, and that corn pads generally have an outside periphery smaller than the inside periphery of the cushion portion of either a callous or bunion pad.

As a feature of the present invention, the machine is particularly designed to produce simultaneously corn pads, (i. e. pads of smaller size) and callous or bunion pads (i. e. pads of larger size), the latter being produced from a portion of the waste material produced in the manufacture of and surrounding the corn pad. The saving in material, labor and machinery is exceedingly important, as should be obvious.

The machine briefly described, comprises a primary moving endless conveyor functioning to feed a strip of raw material to a rotary die which cuts the centers from said strip. An automatically operated picker removes these centers, and a brush or similar element working in conjunction with said picker, removes the centers from the path of forward movement of the strip. Another strip of raw material may be then automatically applied to the surface of said forwardly moving strip and the multi-ply strip having the center holes covered is fed to a second rotary die which operates thereon to mark out or define the outside edges of the pad. The material within the area defined by the latter die comprises the smaller pad. The forwardly moving sheet is then operated upon by a third rotary die which cuts an outline to define the inner edge of the larger size pad. This latter cut surrounds the preceding cut, the area of material defined by these two cuts comprising a ring of waste which is automatically picked up and removed from the path of the forwardly moving strip.

The connected strip from which the centers and rings have been removed in forming the smaller size pad, is then separated from the endless conveyor and from the smaller size pads, the latter moving forwardly on the primary conveyor to a point where they are stripped from the conveyor, automatically applied to a suitable gauze base, which latter is automatically severed into individual strips containing a predetermined number of spaced smaller pads, which strips are collected in a suitable receptacle.

The continuous strip which has been separated and removed from the primary conveyor, passes to a secondary or auxiliary conveyor where another strip of raw material is applied. A fourth rotary die then acts on said strip moving forwardly on the auxiliary conveyor to cut or define the outside edge of the larger size pads. Subsequent to this latter operation, the waste material surrounding the latter cuts, is removed and eliminated, the larger pads moving forwardly on the auxiliary conveyor, passing to a mechanism which automatically applies a gauze-like base, which latter is automatically severed to produce strips of gauze-like material, each having attached thereto an equal predetermined number of the larger size pads which are then collected in a suitable receptacle.

The entire operation from the feeding of the first strip of raw material to the collecting of the different size pads on individual strips of gauze-like material, is entirely automatic.

The method and machine of the present invention, results in a greatly increased quantity of pads being produced per time unit, as compared with the automatic machines in use at the present time.

It is an object of the present invention to provide an automatic machine for simultaneously producing pads of different sizes or shapes, and more specifically, smaller pads and larger pads, the latter being formed from a portion of the waste resulting from making the smaller size pads.

It is another object of the invention to provide an auxiliary conveyor and instrumentalities associated therewith, whereby with little adjustment, a machine normally equipped to make pads of only one size or shape can be easily converted into a machine for simultaneously making pads of smaller and larger sizes by combination with said auxiliary conveyor and mechanism associated therewith.

Another object of the invention is to provide in a machine of the character described, means for automatically eliminating waste.

Many other important advantages and objects of the present invention will be more clearly apparent from the following description.

In the drawings:

Fig. 1 is a diagrammatic side elevational view of the complete machine.

Figs. 2 to 10 both inclusive, are fragmentary plan views illustrating the appearance of the strip of raw material subsequent to each successive operation thereon.

Figs. 11 and 12 respectively, are similar views of the large and small size pads produced as final products.

Fig. 13 is a cross sectional view taken on line 13—13 of Fig. 11.

Fig. 14 is a cross sectional view taken on line 14—14 of Fig. 12.

Referring more in detail to the drawings, 1 designates a strip of flexible raw material which may be fed from the roll 2. According to the present invention, this strip 1 may comprise a single or multiple ply strip of adhesive tape. This adhesive tape is manufactured as a commercial product in rolled form, and comprises a strip which in the present instance, is two inches wide, on one surface of which is applied adhesive material. This strip 1 is fed forward with the adhesive surfacing facing downwardly between the pressure roll 3 and onto the upper surface of a forwardly moving primary endless conveyor 4, passing around the spaced driven rotors 5 and 6. The strip is carried forward by the moving conveyor 4, and is first acted upon by the rotary element 7 having dies 8 arranged circumferentially thereon.

The dies 8 cut through the strip and produce the outline indicated at 9 in Fig. 1. The strip is carried forward from the rotary die 7 to the picker illustrated diagrammatically at 10, which picks up and dislodges the center 11 (Fig. 2), the brush 12 acting to brush aside and eliminate the center 11 from the path of forward movement of the strip 1. Subsequent to the brushing action, the strip has a hole of the shape illustrated at 13 (Fig. 3) made therein. The strip is then carried forward to the point where another strip of similar material 14, fed from the roll 15, is adhesively united thereto. In practice, in order to prevent the adhesive surface of strip 14 from slowing up the operation due to excessive adhesiveness of its adhesive surface, there is interposed a non-adhesive protecting strip 16 which is separated from strip 14 and rolled up separately on the roll 17, the roll 18 serving to maintain proper tension. The strip 14 is caused to adhere to the strip 1 by means of pressure imposed through the medium of the pressure roll illustrated diagrammatically at 19. This multi-ply strip designated 19' (Fig. 4) is then fed to the second rotary element 20 having the dies 21 disposed on its circumference. These dies 21 cut through the multi-ply strip 19' to produce the outline illustrated at 22 (Fig. 5), which is the outline of the outer edge of the smaller pad as completed.

The multi-ply strip 19' is then fed to a third rotary element 23 having dies 24 disposed circumferentially thereof, adapted to cut through the strip, and produce the outline illustrated at 25 (Fig. 6).

It is to be noted that the cut producing the outline 25 surrounds the cut which produces the outline 22, and for the purpose of explanation, it may be here stated that the cut producing the outline 25 will form the outline of the inner edge of the larger pad as completed. The material between the outlines 22 and 25, designated at 26 (Fig. 6), comprises material which, according to the present invention, is to be eliminated as waste. The picker illustrated diagrammatically at 27 is adapted to make contact with the waste material 26 to dislodge same, the brush 28 acting to brush away and eliminate this waste 26 from the path of travel of the strip whereby the strip takes the form illustrated in Fig. 7, the numeral 29 designating the space from which the waste ring 26 was eliminated. The conveyor moves forwardly to the element 30, which separates the strip from the primary conveyor, and incidentally from the smaller size pads which are fully formed. This connected strip is illustrated diagrammatically at 31, the holes 32 having been formed therein due to the removal of the waste piece 26, and the separation therefrom of the smaller pad which, from the point of separation, moves forwardly on the primary endless conveyor 4.

The primary endless conveyor 4 then moves forwardly to the means 34 for stripping the small pads 33 therefrom (Fig. 7). Simultaneously, there is fed upwardly from the roll 35 a strip of gauze-like material 36, said strip being fed into the nip between the stripper 34 and the conveyor 4 whereby the pads as they are stripped from the conveyor, are applied to the surface of the gauze, the friction-pressure roller 37 assisting in the removal and in the application of the pads to the gauze. The roller 37 may be connected to rotate in timed relation with the friction-pressure rollers 38 by means of the intermediate roller 39. The rollers 38 comprise sets of upper and lower rollers, preferably provided with end flanges to guide the travel of the strip of gauze. Similar rollers 40 may also be provided.

Describing now the means for automatically shearing the gauze into sizes of predetermined uniform length having imposed thereon a predetermined uniform number of pads, on the shaft 41 on which the roll 6 is mounted, is also mounted a ratchet 42 adapted to mesh with the pawl 43 carried on the end of a rocking lever 44 pivoted intermediately at 45 and 46. Normally, the spring 47 anchored at 48 holds the pawl 43 against the surface of the ratchet, so that when one of the grooves in the ratchet moves around to the proper position, the pawl will engage said groove. This actuates the upright rod 49 carrying the shearing knife 50, whereby the shearing of the fabric base takes place. The separated strips are then diverted on the inclined track 51 and collected in the receptacle 52.

Briefly summing up the foregoing description, it will be noted that the strip of raw material has been fed through the machine, acted upon by the rotary dies, the center and ring waste removed, and the connected strip being separated. The small pads are attached to gauze which has been suitably severed into strips and collected, ready for packing and shipping.

Referring now to the specific instrumentality for acting upon the continuous strip 31 from which the center and ring waste and small pads have been removed, this strip is directed upwardly to the auxiliary conveyor 53 rotating around the driven elements 54 and 55, passing under the guide roll 56. Another strip of adhesive tape designated 57, is fed from the roll 58 and adhesively united with the strip 31, due to the pressure imposed by the pressure roll 59. A protecting strip 60 is separated from the strip of adhesive tape 57, which protecting strip is wound on the roll 61, passing under the tension roll 62. At this point, the multi-ply strip may be designated 63 (Fig. 9).

The next operation upon the strip 63 is the cut therethrough to form an outline designated 64 (Fig. 10). This cut 64 may be produced by the dies 65 carried on the circumference of the rotary element 66. It is to be noted that the outline of the cut 64 is larger than any of the previous cuts, and for the purpose of explanation, it may be here stated that the cut 64 comprises the outline of the outer edge of the completed large size pad.

From the rotary die 66, the strip is carried by the conveyor to the means 67, which separates the waste surrounding the outlines 64, which waste is preferably passed upwardly in the form of a connected strip as illustrated at 68, being wound about a core to form the spool 69. The large size pads designated 70 are carried along by the auxiliary conveyor 53, until they reach the stripping element 71, which removes the pads from the auxiliary conveyor and applies them to a strip of gauze-like material 72 fed upwardly into the nip between the inner end of the stripper 71 and the conveyor 53 from the reel 73. Friction, guide and pressure rollers designated diagrammatically at 74, assist in removing the pads from the conveyor and adhesively uniting same to the gauze, said rollers also functioning to guide and move the strip of gauze-like material forward.

Means are provided for automatically shearing or severing the strip of gauze-like material 72 into individual strips of predetermined length and width, and containing a predetermined uniform number of pads applied thereto. This means comprises a ratchet 75 mounted on the shaft 76 on which the roll 55 is mounted, the grooves of said ratchet being adapted to successively engage the pawl-like, upturned end 77 of a rocking lever 78. Normally, the inner edge of the pawl 77 contacts the spaces between the grooves of the ratchet through tension exercised by the spring 79 anchored at 80, and will engage the grooves and permit meshing engagement therewith as each groove moves successively to that point. When the pawl 77 engages one of the grooves in the ratchet, the action is transferred through the rocking lever 78 to the upright 81 pivoted at 82, which upright carries a shearing knife 83 adapted to sever the gauze-like strip. The separated strips then pass down the incline 84, and are collected in the receptacles 85, from which they are removed for packing and shipping.

The operation of the machine should be apparent from the foregoing description. The multi-ply thickness of the finished pads can be varied within wide limits. However, for the purpose of specific illustration, the corn pad designated as a whole 85 (Fig. 12) comprises a three-ply structure of which two plies comprise the cushioning plies from which the center had been removed leaving the open space 13, while the outer ply 14 covers the opening 13.

The outer edge of this smaller ply is smaller than the inner edge of the larger ply designated at 70 (Fig. 11). This larger ply may comprise a four-ply structure having a cover ply 57 and three cushion plies 1, 1 and 14 from which the center has been removed leaving the opening 32. It is to be understood that I expressly do not wish to limit myself to the particular shape of the smaller or larger pads illustrated, as the shapes and sizes of pads capable of being produced by the present machine, may vary widely within the contemplation of the invention, it being necessary only to construct the dies 21, 24 and 65 of the desired size and shape.

In any event, when simultaneously making smaller and larger size pads, the outer edge of the smaller size pad will always be smaller than the inner edge of the larger size pads.

The machine is completely automatic in operation, and has the advantage of utmost efficiency, as will be obvious to those skilled in the art. It is to be understood that the illustration in Fig. 1 is purely diagrammatic, and that relative sizes and obvious rearrangement of parts fall within the skill of those versed in the art.

The various actuating mechanisms are driven in synchronized timed relation by any desired mechanical arrangement, which it is not necessary to describe, as it will be obvious.

I claim as my invention:

1. A machine for simultaneously making pads of different sizes, comprising in combination, primary and auxiliary moving conveyors, means for feeding to the primary conveyor a strip of flexible adhesive tape, sets of rotatable means adapted to act successively on said strip to produce incisions of predetermined outline taking the form of the small size pad, means interposed therebetween adapted to feed and unite another strip of adhesive tape with the first mentioned strip, means for removing the surrounding waste material in connected strip form to leave separately formed pads of small size on the primary conveyor, means for feeding and uniting to said connected strip of waste an additonal strip of adhesive tape, rotatable means acting thereon to produce incisions of predetermined outline taking the form of the large size pads, means for removing the surrounding waste, and means cooperatively associated with each conveyor for feeding and uniting strips of gauze-like material to said separated pads.

2. A machine for simultaneously making pads of different sizes, comprising in combination, primary and auxiliary moving conveyors. means for feeding to the primary conveyor a strip of flexible adhesive tape, sets of rotatable means adapted to act successively on said strip to produce incisions of predetermined outline taking the form of the small size pad, means interposed therebetween adapted to feed and unite another strip of adhesive tape with the first mentioned strip, means for removing the surrounding waste material in connected strip form to leave separately formed pads of small size on the primary conveyor, means for feeding and uniting to said connected strip of waste an additional strip of adhesive tape, rotatable means acting thereon to produce incisions of predetermined outline taking the form of the large size pads, means for removing the surrounding waste, and means cooperatively associated with each conveyor for feeding and uniting strips of gauze-like material to said separated pads, said latter means comprising a stripper whereby the pads are removed from each of the conveyors and applied separately to said gauze-like material.

3. A machine for simultaneously making pads of different sizes, comprising in combination, primary and auxiliary moving conveyors, means for feeding to the primary conveyor a strip of flexible adhesive tape, sets of rotatable means adapted to act successively on said strip to produce incisions of predetermined outline taking the form of the small size pad, means interposed therebetween adapted to feed and unite another strip of adhesive tape with the first mentioned strip, means for removing the surrounding waste material in connected strip form to leave separately formed pads of small size on the primary conveyor, means for feeding and uniting to said connected strip of waste an additional strip of adhesive tape, rotatable means acting thereon to produce incisions of predetermined outline taking the form of the large size pads, means for removing the surrounding waste, and means cooperatively associated with each conveyor for feeding and uniting strips of gauze-like material to said separated pads, and means under the control of the means driving the conveyors for shearing the gauze-like strip into strips containing a predetermined uniform number of pads.

4. An apparatus for simultaneously making pads of a small and large size respectively, comprising in combination primary and secondary endless conveyors, means for feeding to the primary conveyor a continuous strip of material to be acted upon, rotary dies adapted to act successively on said strip to form a removable waste center, an outline of the small pad and an outline of the inner edge of the large pad, means for automatically removing the waste from said rotary die cutting operations, means feeding the connected strip of material from which the smaller pads have been cut out from the primary conveyor to the secondary conveyor, whereby said smaller pads are carried forward by the primary conveyor, means for feeding and adhesively uniting another strip of raw material to said latter strip, rotary means acting on said united strip to form an outline of the larger size pads, and separate means for separately stripping the smaller and larger size pads respectively from the primary and secondary endless conveyors, separate means for applying same to strips of gauze-like material, and separately actuated means for shearing the gauze-like strip into individual strips containing predetermined numbers of smaller and larger size pads respectively.

OTTO G. SCHMITT.